US011721322B2

(12) United States Patent
Aher et al.

(10) Patent No.: US 11,721,322 B2
(45) Date of Patent: Aug. 8, 2023

(54) AUTOMATED WORD CORRECTION IN SPEECH RECOGNITION SYSTEMS

(71) Applicant: Rovi Guides, Inc., San Jose, CA (US)

(72) Inventors: Ankur Anil Aher, Maharashtra (IN); Jeffry Copps Robert Jose, Tamil Nadu (IN)

(73) Assignee: Rovi Guides, Inc., San Jose, CA (US)

( * ) Notice: Subject to any disclaimer, the term of this patent is extended or adjusted under 35 U.S.C. 154(b) by 43 days.

(21) Appl. No.: 16/804,201

(22) Filed: Feb. 28, 2020

(65) Prior Publication Data
US 2021/0272550 A1  Sep. 2, 2021

(51) Int. Cl.
*G10L 15/22* (2006.01)
*G10L 15/01* (2013.01)
*G10L 15/06* (2013.01)
*G10L 15/08* (2006.01)

(52) U.S. Cl.
CPC ............ *G10L 15/01* (2013.01); *G10L 15/063* (2013.01); *G10L 15/08* (2013.01); *G10L 15/22* (2013.01); *G10L 2015/0636* (2013.01); *G10L 2015/086* (2013.01)

(58) Field of Classification Search
CPC ......... G10L 15/22; G10L 15/00; G10L 15/01; G10L 15/06; G10L 15/08; G10L 15/18; G10L 15/1815; G10L 15/183; G10L 15/197; G10L 15/20; G10L 15/222; G10L 15/26; G10L 2015/0636–0638; G10L 2015/221; G10L 2015/223–228
USPC ....... 704/231, 235, 236, 239, 240, 251, 257, 704/270, 270.1
See application file for complete search history.

(56) References Cited

U.S. PATENT DOCUMENTS

| | | | |
|---|---|---|---|
| 4,158,750 A * | 6/1979 | Sakoe | ................ B60R 16/0373 |
| | | | 704/251 |
| 6,292,775 B1 * | 9/2001 | Holmes | .................. G10L 15/10 |
| | | | 704/209 |
| 9,123,339 B1 | 9/2015 | Shaw et al. | |
| 9,190,054 B1 | 11/2015 | Riley et al. | |
| 9,721,564 B2 | 8/2017 | Agarwal | |
| 2003/0216912 A1 | 11/2003 | Chino | |
| 2004/0024601 A1 | 2/2004 | Gopinath et al. | |
| 2006/0293889 A1 * | 12/2006 | Kiss | ...................... G10L 15/22 |
| | | | 704/235 |
| 2011/0077942 A1 | 3/2011 | Ljolje et al. | |
| 2013/0262117 A1 | 10/2013 | Heckmann | |

(Continued)

FOREIGN PATENT DOCUMENTS

WO    2018217194 A1    11/2018

OTHER PUBLICATIONS

PCT International Search Report for International Application No. PCT/US2020/066977, dated Apr. 9, 2021 (14 pages).

*Primary Examiner* — Qi Han
(74) *Attorney, Agent, or Firm* — Haley Guiliano LLP

(57) ABSTRACT

Systems and methods for correcting recognition errors in speech recognition systems are disclosed herein. Natural conversational variations are identified to determine whether a query intends to correct a speech recognition error or whether the query is a new command. When the query intends to correct a speech recognition error, the system identifies a location of the error and performs the correction. The corrected query can be presented to the user or be acted upon as a command for the system.

17 Claims, 6 Drawing Sheets

(56) References Cited

U.S. PATENT DOCUMENTS

| | | |
|---|---|---|
| 2014/0278413 A1 | 9/2014 | Pitschel et al. |
| 2015/0149163 A1 | 5/2015 | Vanblon et al. |
| 2017/0068670 A1 | 3/2017 | Orr et al. |
| 2017/0229120 A1 | 8/2017 | Engelhardt |
| 2020/0143806 A1 | 5/2020 | Sreedhara |
| 2021/0225361 A1* | 7/2021 | Sekine .................. G10L 15/063 |

* cited by examiner

AUTOMATED WORD CORRECTION IN SPEECH RECOGNITION SYSTEMS

BACKGROUND

The present disclosure relates to natural language processing and, more particularly, to systems and related processes for correcting word recognition errors in speech recognition systems.

SUMMARY

Automatic speech recognition (ASR) has become increasingly prevalent for controlling personal electronic devices. Oftentimes, devices, such as televisions, mobile phones, smart speakers, etc., include a search interface that enables users to search for content using a voice input. As the system receives a voice input from the user, the system generates an interpretation of a user's intended command. Because of variations in the way users speak, background noise, similarities between words, limitations of the ASR recognition capabilities, or the like, the interpretations frequently include one or more errors. For example, a user may speak a command "Play my top music hits from iTunes," but the ASR system may interpret the command to be "Play me top music hits from show tunes." When an error has occurred, the user must re-speak the query in its entirety, even if the interpretation error occurred in only a portion of the command. Upon interpreting the command for a second time, the ASR system may correct one error while introducing a new one. For example, the system may incorrectly recognize the command the second time as "Play Mike Top music hits from iTunes," thereby requiring the user to re-speak the command once again. In contrast, when two people are having a conversation, and one person misunderstands the other, the speaker may repeat a misunderstood word without repeating the entirety of what was previously said; oftentimes giving different emphasis to the misunderstood word to indicate that a misunderstanding took place. For example, if Bob tells Alice, "This food is great!" and Alice replies, "No, it wasn't late." Bob may reply "No, GREAT!" Without Bob repeating the entire prior statement, Alice would understand that Bob previously stated, "This food is great," not "This food is late."

In view of the foregoing, the present disclosure provides systems and related methods that, by interpreting a second voice query to determine whether it is intended to correct a previous voice query, are able to correct interpretation errors of user voice commands more accurately than possible with prior systems and methods. In some examples, the systems and related methods described herein allow for a user to correct an ASR interpretation error without requiring the user to repeat the entire command, much as in conversational speech between two people. In such examples, the users can correct an interpretation error by repeating a word that was misinterpreted. For example, when the user speaks the command "Show me Game of Thrones," and the system interprets the command to be "Show me Game of Homes," the user may repeat just the word "Thrones" to correct the interpretation error. Upon detecting the speech input "Thrones," the system will determine that it incorrectly interpreted the word "thrones" as "homes" and will correct the interpretation. In some embodiments, the system will execute the command "Show me Game of Thrones" subsequent to the correction.

When a user speaks, a speech segment is received by a user input component, such as a microphone, and is provided to control circuitry of a device (e.g., a smart speaker or server associated with a personal electronic device). The control circuitry processes the speech segment using an ASR algorithm and determines an interpretation for the received segment. For example, the control circuitry may identify properties of the speech segment (e.g., an acoustic envelope, an intensity, a pitch, a frequency, an amplitude, etc.) and, based on the identified properties, may identify one or more words corresponding to the speech segment (e.g., "Show me game of homes"). The interpretation may be output to a user (e.g., by displaying text of the interpretation on a display, by synthesizing an audio response based on the interpretation, or by executing a command corresponding to the interpretation).

If the user detects an interpretation error, the user may correct the error by repeating the word having the incorrect interpretation. For example, if the user determines that the last word was misinterpreted as "homes" instead of "thrones," the user may speak the word "thrones" to correct the error. The control circuitry, in response to detecting the second speech segment (e.g., the segment containing only "thrones"), determines whether the second speech segment is intended to correct an interpretation error of the first speech segment or if the second speech segment is intended to be a new command.

In some embodiments, the control circuitry determines that the user intends to correct an interpretation error when one or more sound properties of the second segment (e.g., a pitch, an acoustic envelope, a frequency, an amplitude, a correction expression, etc.) match one or more sound properties of the first segment. If, for instance, the control circuitry determines that the sound properties of the first segment and the second segment match, except an intensity, the control circuitry may determine that the user is attempting to correct an interpretation error. For example, when the user determines that the word "thrones" was misinterpreted, the user may shout "THRONES" in a higher pitch shortly after the error is made. When the control circuitry detects that the second segment was spoken in a higher intensity and pitch, the system may determine that the user is attempting to correct an interpretation error. In this manner, the control circuitry can identify a correction to a previous interpretation by detecting natural conversational variations in how a user speaks a query.

The control circuitry may detect that a user intends to correct an interpretation error when there is a correction word in the second segment. For example, when the second segment is "No, thrones," the control circuitry will determine that because the user stated "No" (e.g., the correction word), the user is attempting to correct an interpretation error. In such embodiments, the control circuitry can correct an error by identifying words spoken by a user indicating that an error has occurred.

In other embodiments, the control circuitry determines that the user intends to correct an interpretation error when a word in the second segment (e.g., "Thrones") is frequently misinterpreted for a word interpreted from the first segment (e.g., "Homes"). For example, control circuitry may access a database storing pairs of frequently misinterpreted words and may determine that "Thrones" and "Homes" are frequently misinterpreted for each other. The control circuitry corrects the interpretation by replacing the word "Homes" with the word "thrones." By accessing associations between words having frequent misinterpretations, the control circuitry can locate and correct an interpretation error without requiring the user to restate an entire command.

In some aspects, if more than a threshold amount of time has passed between receiving the first and second segment, the control circuitry will determine that the user is issuing a new command instead of trying to correct an interpretation error. For example, if more than 30 seconds have passed since receiving the first segment, the control circuitry will interpret the second segment as a new command and will not try to determine whether the user is trying to correct an ASR error for the first segment.

BRIEF DESCRIPTION OF THE DRAWINGS

The above and other objects and advantages of the disclosure will be apparent upon consideration of the following detailed description, taken in conjunction with the accompanying drawings, in which.

DETAILED DESCRIPTION

Figure 1:
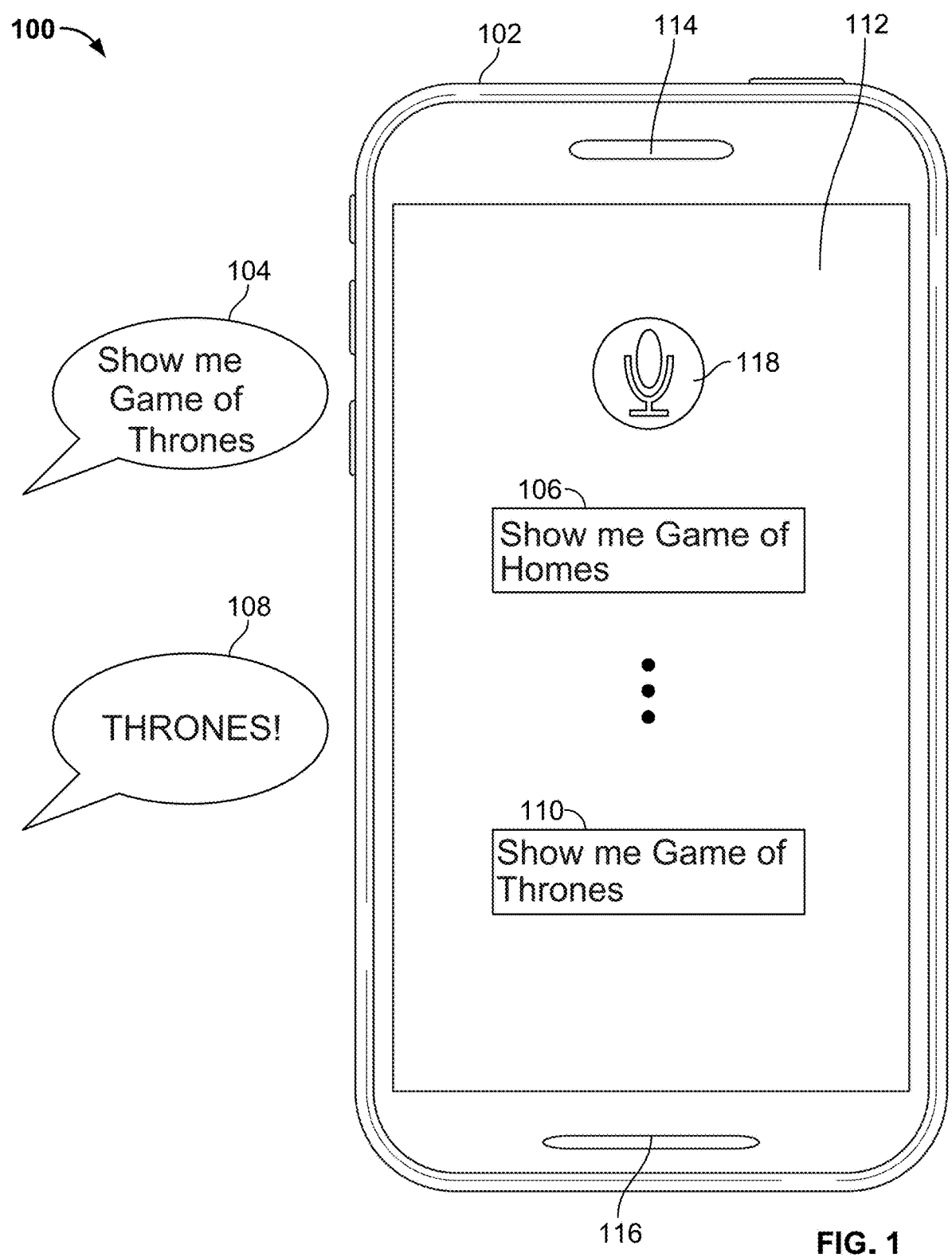
FIG. 1 illustrates an overview of a scenario in which a system corrects an ASR error, in accordance with some embodiments of the disclosure.

FIG. 1 illustrates an overview of a scenario in which system 100 corrects an ASR error, in accordance with some embodiments of the disclosure. System 100 includes device 102, such as a smart phone, a smart speaker, a smart television, or the like, that has various user interfaces configured to interact with one or more users. In some examples, device 102 has a display 112, which is configured to display information via a graphical user interface, and a microphone 116, which is configured to receive natural language queries (e.g., queries 104 and 108) as they are uttered by a user. In some embodiments, device 102 has an audio driver, such as a speaker 114, configured to audibly provide information, such as responses (e.g., responses 106 and 110) to the received natural language queries (e.g., queries 104 and 108). In some embodiments, system 100 includes a network (not depicted in FIG. 1), such as the Internet, one or more servers (not depicted in FIG. 1), and one or more content databases (not depicted in FIG. 1). Device 102 may execute the ASR process locally on device 102, or some or all of the ASR process may be executed by the one or more servers.

Device 102 successively receives natural language queries 104 and 108 (e.g., "Show me Game of Thrones" and "THRONES!" respectively) via microphone 116. In some embodiments, prior to receiving queries 104 and 108, device 102 activates listening on microphone 116 in response to triggering by a specific keyword or selection of a user interface element. For example, device 102 may activate listening on microphone in response to a user selecting a voice input button (e.g., button 118) or by detecting a wake word such as "Hey Siri." Device 102 may activate listening on microphone 116 for a predetermined amount of time or until a detected end of a voice input.

In response to detecting the voice input, device 102 may perform an ASR process to identify text corresponding to the spoken query. For example, upon detecting query 104 ("Show me Game of Thrones"), device 102 performs an ASR process to detect words present in the voice query. In some embodiments, device 102 identifies text in the query by identifying sound properties of the query (such as an acoustic envelope, an intensity, a pitch, a frequency, amplitude, etc.) and compares the sound properties to an acoustic model or speech corpus. Based on the comparison, device 102 determines a textual interpretation of the received query (query 104). For example, device 102 may compare portions of the voice input to entries in the acoustic model and determine how closely each portion matches an entry in the acoustic model.

Device 102 may assign weights or confidence values to each word in the textual representation based on how closely the speech segment matches an entry in an acoustic model or speech corpus. For example, device 102 may process query 104 and may determine that the words having the highest weights or confidence values for each portion are "Show me Game of Homes." A high confidence value (e.g., 0.9) is assigned to the word "Show" when the corresponding portion of the voice input closely matches the acoustic model. In contrast, a low confidence value is assigned to the word "Homes" (e.g., 0.45) and to the word "Thrones" (e.g., 0.4) when the corresponding portion of the voice input partially matches the acoustic model entry for either "Homes" or "Thrones." The system displays the interpretation of the query "Show me Game of Homes" (response 106) on display 112 of device 102. In some embodiments, device 102 synthesizes the text of response 106 to an audio signal and outputs the audio signal via speaker 114. In some embodiments, device 102 will re-activate microphone 116 upon presenting response 106 to detect whether the user provides a subsequent voice input (e.g., a subsequent voice input correcting an ASR error).

ASR interpretation errors (such as detecting "homes" instead of "thrones") may occur when an input audio is not clear, there are differences between how the user speaks and the voice model, the user speaks a word that sounds similar to other words, and/or in other similar circumstances. In instances where ASR errors occur, the systems and associated methods provided herein allow for a user to cause device 102 to correct the ASR error without requiring repetition of the previous query in its entirety. The systems and methods described herein detect natural conversational methods that users utilize to correct interpretation errors and make corrections to ASR errors based on the detection.

When the user detects an ASR error (e.g., in response to device 102 displaying response 106 "Show me Game of Homes"), the user may trigger correction of the error by repeating a part of the query where the detection error occurred in a louder voice or at a higher pitch. For example, the user may speak query 108 ("THRONES!") loudly to indicate to device 102 that an interpretation error occurred. In response to detecting the second query, device 102 determines whether query 108 is intended to correct an ASR error or whether query 108 is a new command. An exemplary process for detecting whether the query is intended to correct an ASR error is described further with respect to FIG. 4.

When device 102 determines that query 108 is intended to correct an ASR error, device 102 determines where in the error occurred and corrects the error. For example, device 102 may perform an ASR process on query 108 and may assign a 0.45 confidence value that the word is "Homes" and assign a 0.4 confidence value that the word is "thrones." However, because the user intends to correct an ASR error in response 106, the system may generate response 110 by replacing the word "Homes" with the word "Thrones." Accordingly, a word with a higher confidence value ("Homes") is replaced with a word having a lower confidence value ("Thrones") because the system detected the user's intent to correct an ASR error.

The corrected reply (e.g., reply 110) is output to the user by displaying the corrected response (response 110) on display 112. In some embodiments, the device performs a command based on the corrected response. For example, device 102 may display program listings for the show Game of Thrones in response to correcting the ASR error.

Figure 2:
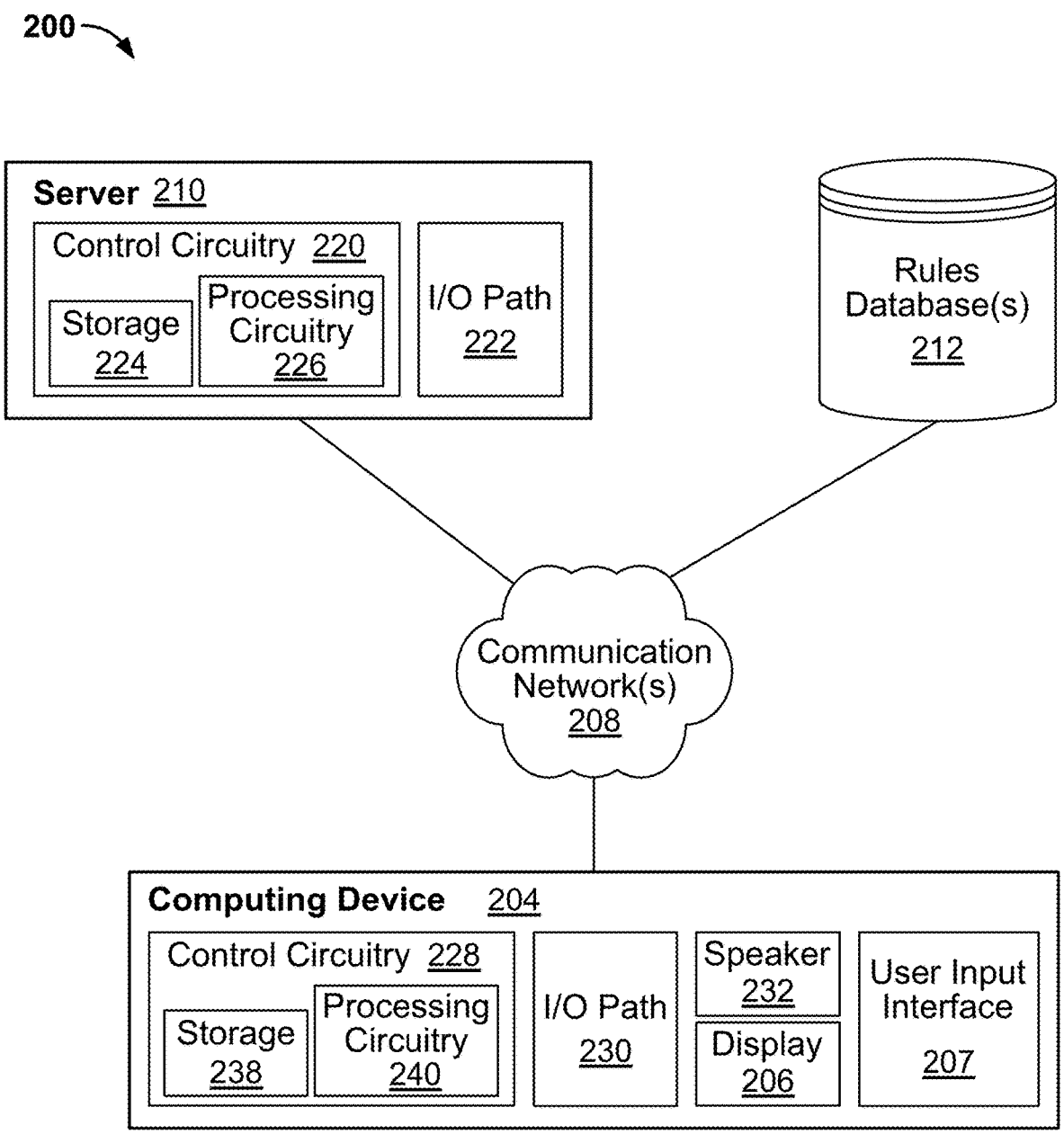
FIG. 2 is an illustrative block diagram showing a system for correcting an ASR error, in accordance with some embodiments of the disclosure.

FIG. 2 is an illustrative block diagram showing additional details of an example of system 100 for correcting an ASR error, in accordance with some embodiments of the disclosure. Although FIG. 2 shows system 200 including a number and configuration of individual components, in some embodiments, any number of the components of system 200 may be combined and/or integrated as one device, such as device 102 of system 100. System 200 includes computing device 204, server 210, and database 212, each of which is communicatively coupled to communication network 208, which may be the Internet or any other suitable network or group of networks. In some embodiments, system 200 excludes server 210, and functionality that would otherwise be implemented by server 210 is instead implemented by other components of system 200, such as computing device 204. In still other embodiments, server 210 works in conjunction with computing device 204 to implement certain functionality described herein in a distributed or cooperative manner.

Server 210 includes control circuitry 220 and input/output (hereinafter "I/O") path 222. Control circuitry 220 includes storage 224 and processing circuitry 226. Computing device 204, which may be device 102 depicted in FIG. 1, a personal computer, a laptop computer, a tablet computer, a smartphone, a smart television, a smart speaker, or any other type of computing device, includes control circuitry 228, I/O path 230, speaker 232 (e.g., speaker 114 of device 102), display 206 (e.g., display 112 of device 102), and user input interface 207 (e.g., a touchscreen of display 112 or microphone 116 of device 102). In some embodiments user input interface 207 includes a voice-user interface (e.g., microphone 116 coupled with voice processing circuitry) configured to receive natural language queries uttered by users. Control circuitry 228 includes storage 238 and processing circuitry 240. Control circuitry 220 and/or 228 may be based on any suitable processing circuitry such as processing circuitry 226 and/or 240. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 224, storage 238, and/or storages of other components of system 200 (e.g., storages of database 212, and/or the like) may be an electronic storage device. As referred to herein, the phrase "electronic storage device" or "storage device" should be understood to mean any device for storing electronic data, computer software, or firmware, such as random-access memory, read-only memory, flash memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 224, storage 238, and/or storages of other components of system 100 may be used to store various types of content, metadata, and or other types of data. Non-volatile memory may also be used (e.g., to launch a boot-up routine and other instructions). Cloud-based storage may be used to supplement storages 224, 238 or instead of storages 224, 238. In some embodiments, control circuitry 220 and/or 228 executes instructions for an application stored in memory (e.g., storage 224 and/or 238). Specifically, control circuitry 220 and/or 228 may be instructed by the application to perform the functions discussed herein. In some implementations, any action performed by control circuitry 220 and/or 228 may be based on instructions received from the application. For example, the application may be implemented as software or a set of executable instructions that may be stored in storage 224 and/or 238 and executed by control circuitry 220 and/or 228. In some embodiments, the application may be a client/server application where only a client application resides on computing device 204, and a server application resides on server 210.

The application may be implemented using any suitable architecture. For example, it may be a stand-alone application wholly implemented on computing device 204. In such an approach, instructions for the application are stored locally (e.g., in storage 238), and data for use by the application is downloaded on a periodic basis (e.g., from an out-of-band feed, from an Internet resource, or using another suitable approach). Control circuitry 228 may retrieve instructions for the application from storage 238 and process the instructions to perform the functionality described herein. Based on the processed instructions, control circuitry 228 may determine what action to perform when input is received from user input interface 207.

In client/server-based embodiments, control circuitry 228 may include communication circuitry suitable for communicating with an application server (e.g., server 210) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 228 runs a web browser that interprets web pages provided by a remote server (e.g., server 210). For example, the remote server may store the instructions for the application in a storage device. The remote server may process the stored instructions using circuitry (e.g., control circuitry 220) and/or generate displays. Computing device 204 may receive the displays generated by the remote server and may display the content of the displays locally via display 206. This way, the processing of the instructions is performed remotely (e.g., by server 210) while the resulting displays, such as the display windows described elsewhere herein, are provided locally on computing device 204. Computing device 204 may receive inputs from the user via input interface 207 and transmit those inputs to the remote server for processing and generating the corresponding displays.

A user may send instructions to control circuitry 220 and/or 228 using user input interface 207. User input interface 207 may be any suitable user interface, such as a remote control, trackball, keypad, keyboard, touchscreen, touchpad, stylus input, joystick, voice recognition interface, gaming controller, or other user input interfaces. User input interface 207 may be integrated with or combined with display 206, which may be a projector, a liquid crystal display (LCD), a light emitting diode (LED) display, an electronic ink display, or any other equipment suitable for displaying visual images.

Server 210 and computing device 204 may transmit and receive content and data via I/O path 222 and 230, respectively. For instance, I/O path 222 and/or I/O path 230 may include a communication port configured to transmit and/or receive (for instance to and/or from content database 212), via communication network 208, content item identifiers, natural language queries, responses to natural language queries, and/or other data. Control circuitry 220, 228 may be used to send and receive commands, requests, and other suitable data using I/O paths 222, 230.

Figure 3:
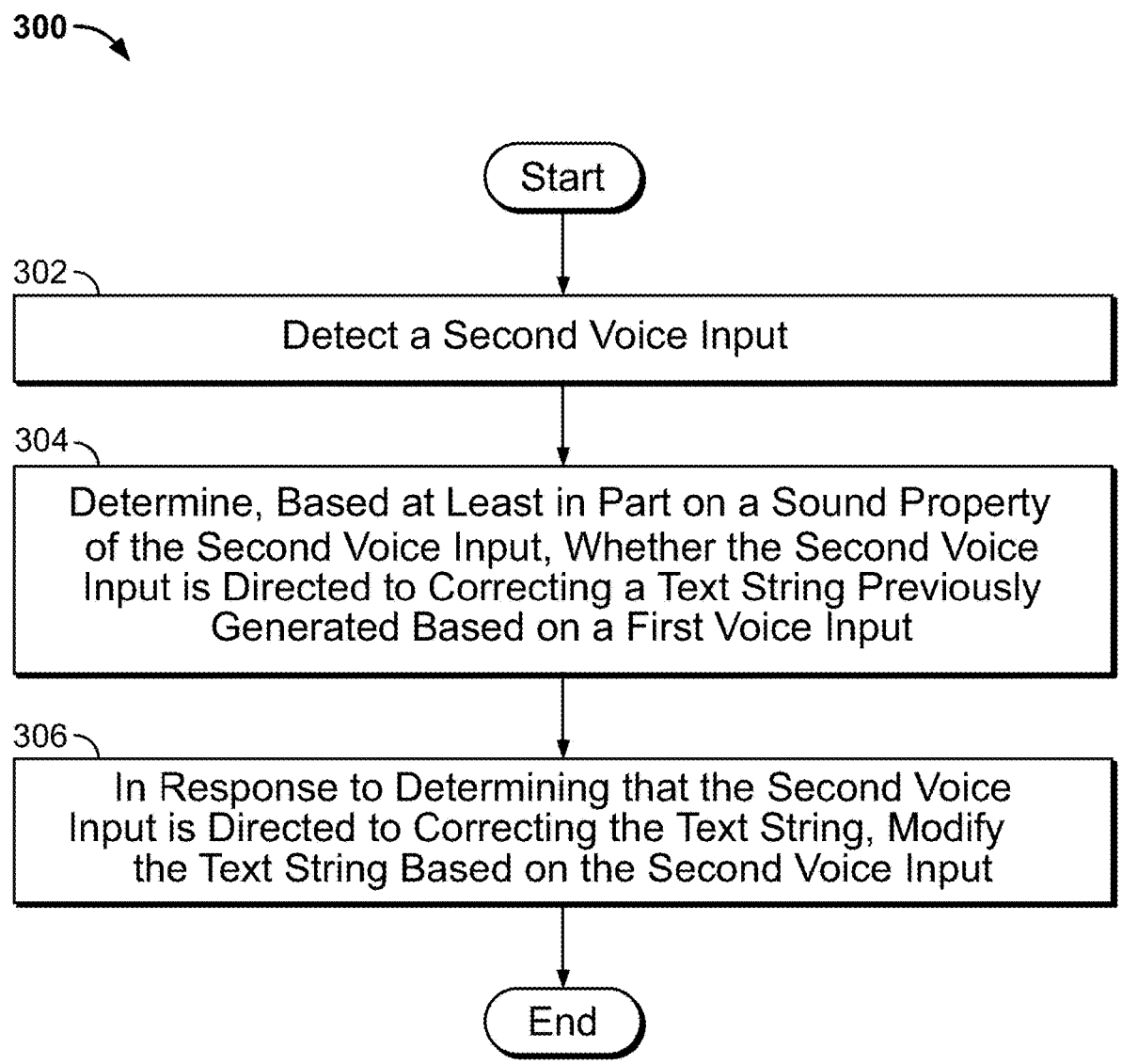
FIG. 3 depicts an illustrative flowchart for correcting an ASR error, in accordance with some embodiments of the disclosure.

Having described system 200, reference is now made to FIG. 3, which depicts an illustrative flowchart for correcting an ASR error, which may be implemented by system 100 or 200, in accordance with some embodiments of the disclosure. In various embodiments, individual steps of process 300, or any process described herein, may be implemented by one or more components of system 100 or 200. Although the present disclosure may describe certain steps of process 300 (and of other processes described herein) as being implemented by certain components of system 200, this is for purposes of illustration only, and other components of system 200 may implement those steps instead. At 302, control circuitry 228 detects a second voice input, such as query 104 and query 108. As described above, control circuitry 228 receives the voice input by way of user input interface 207. In some embodiments, detection of the second voice input includes detecting a wake word and then recording a second voice input received subsequent to detection of the wake word. For example, control circuitry 228 may determine that subsequent to the wake word "Hey Siri," a voice input stating "THRONES!"

At 304, control circuitry 228 determines, based at least in part on a sound property of the second voice input (e.g., query 108), whether the second voice input is directed to correcting a text string (e.g., response 106) previously generated based on a first voice input (e.g., query 104). A sound property of the second voice input may be a spectral/acoustic envelope, an intensity, a pitch, a frequency, an amplitude, a correction expression, etc. Control circuitry 228 may compare the sound properties for the first voice input (e.g., query 104) to the sound properties of the second voice input (e.g., query 108) and may determine that the user is attempting to correct the text string (e.g., response 106) when at least a threshold value of the sound properties of the first and second voice inputs match but at least one differs. For example, the spectral envelope for the same words spoken by a user in both voice inputs (e.g., queries 104 and 108) will approximately match. For example, control circuitry 228 may detect that the spectral envelope for the term "Thrones" in query 104 approximately matches the spectral envelope for the term "THRONES" in query 108, and may detect that the intensity or pitch varies between the utterances of the term. Because the words sound the same, but they were stated in different pitches/intensities control circuitry 228 will determine that the user is attempting to correct response 106.

At 306, control circuitry 228, in response to determining that the second voice input is directed to correcting the text string, modifies the text string based on the second voice input. For example, control circuitry 228 may modify the text string by locating the word that the user intends to correct (e.g., the word "Homes" in response 106) based on the second voice input (e.g., the word "thrones" in query 108). Control circuitry 228 may output the corrected text string to the user by displaying the modified text string (e.g., response 110) on a display (e.g., display 206 or display 112), converting the modified text string to audio and outputting via an audio device (e.g., speaker 114 or 232) or by performing an action in response to the modified text string (e.g., presenting program listings for Game of Thrones).

Figure 4:
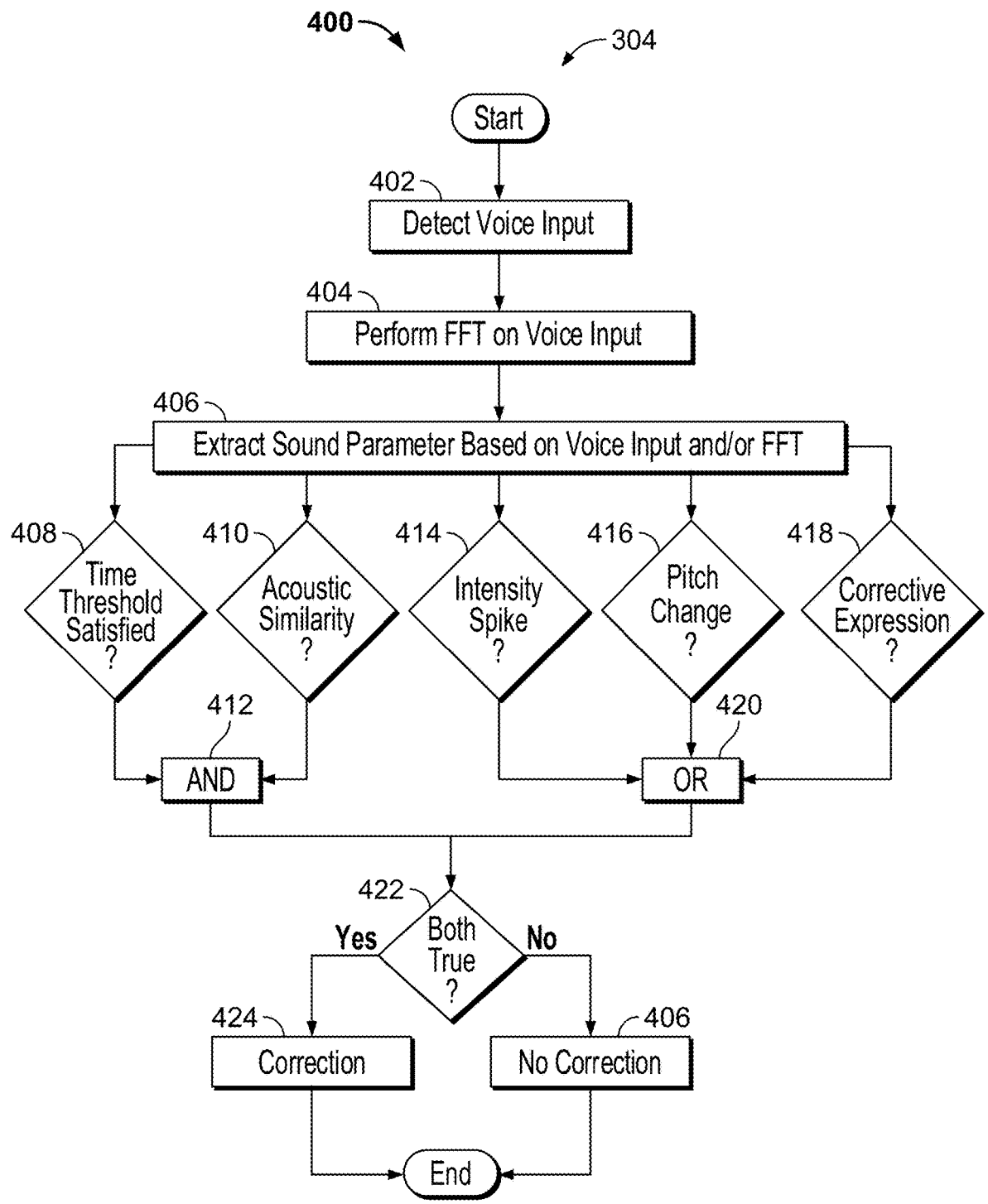
FIG. 4 depicts an illustrative flowchart for determining whether a user intends to correct an ASR error, in accordance with some embodiments of the disclosure.

FIG. 4 depicts an additional example process 304 for determining whether a user intends to correct an ASR error, in accordance with some embodiments of the present disclosure. At 402, control circuitry 228 detects a voice input (e.g., query 108) via a user input device such as microphone 116 or user input interface 207. At 404, control circuitry 228 performs a fast Fourier transform (FFT) on the voice input to identify the frequency components of the voice input. At 406, control circuitry 228 extracts sound parameters based on the voice input and on the FFT. For example, control circuitry 228 may extract sound parameters such as an acoustic envelope, an intensity, a pitch, frequency, amplitude, or the presence of a correction expression.

At 408, control circuitry 228 determines whether a time threshold is satisfied for detected voice input. For example, control circuitry 228 may retrieve a threshold time limit for estimating whether the user intends to correct a response or not. The time limit may be based on a computed average amount of time that it takes for a user to attempt to correct an interpretation error by a voice control device. For example, if, on average, a user will attempt to correct an error by a voice control device within 10 seconds, the threshold time limit may be set as 10 seconds. Therefore, any voice inputs received more than 10 seconds after outputting a response will be interpreted by control circuitry 228 as a new query. Any voice inputs received less than 10 seconds after outputting a response will be analyzed further to determine whether the user intends to correct a response by the system.

Figure 5:
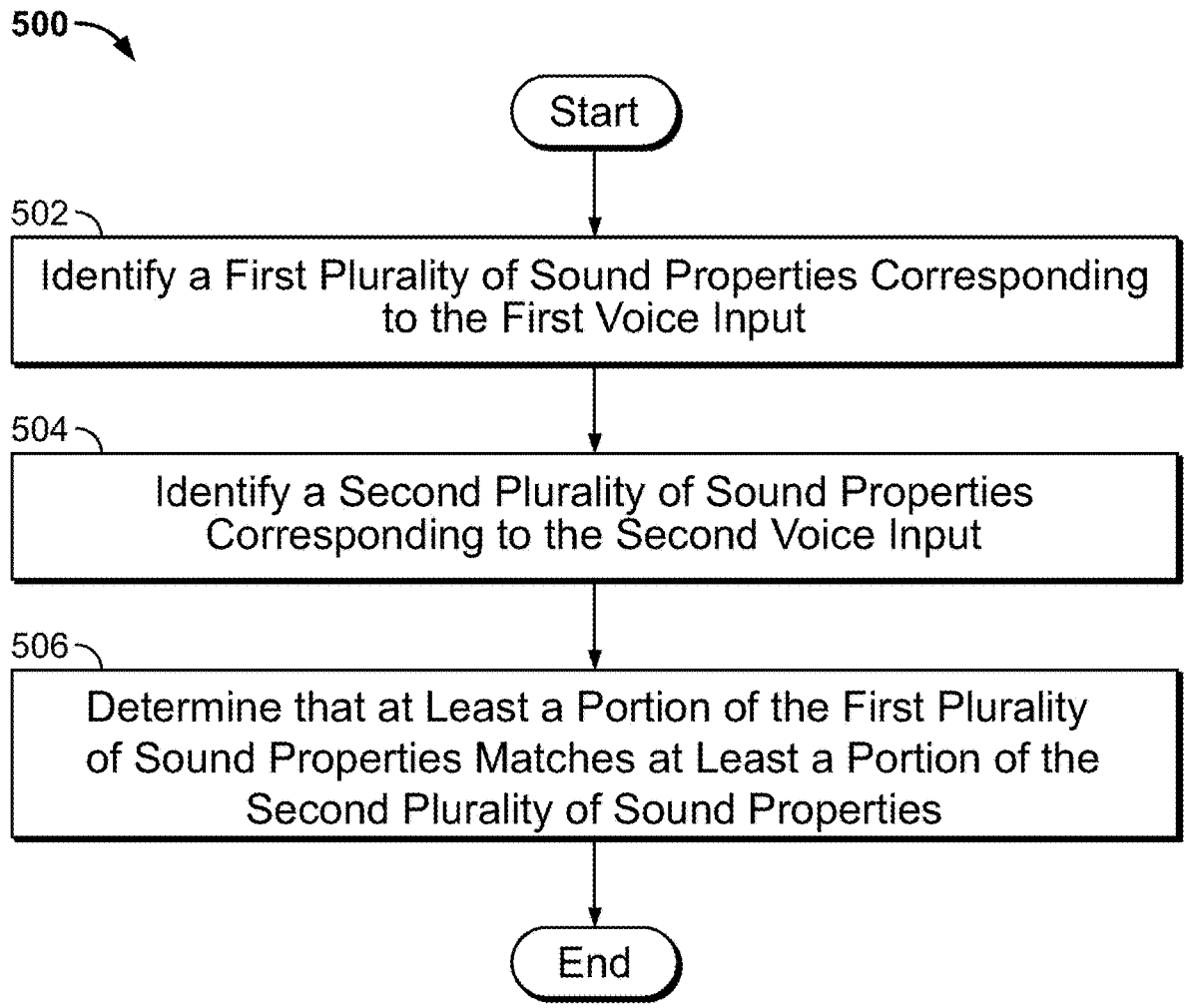
FIG. 5 depicts an illustrative flowchart for identifying whether a user intends to correct an error based on sound properties of a voice input, in accordance with some embodiments of the disclosure.

At 410, control circuitry 228 determines whether there is an acoustic similarity between the second voice input and the first voice input. By determining whether there is an acoustic similarity between the second voice input and the first voice input, control circuitry 228 may more accurately predict whether the user intends to make a correction and if so, and may determine the location of the ASR error. FIG. 5 depicts exemplary process 500, which may be employed at 410 to determine whether the second voice input is acoustically similar to the first voice input. At 502 control circuitry 228 identifies a first plurality of sound properties corresponding to the first voice input. For example, control circuitry 228 may identify properties of the sound wave and perform a FFT on the first voice input (e.g., query 104) to identify an acoustic envelope, intensity, pitch, frequency, and/or amplitude. At 504, control circuitry 228 identifies a second plurality of sound properties (e.g., acoustic envelope, intensity, pitch, frequency, and/or amplitude) corresponding to the second voice input (e.g., query 108).

At 506, control circuitry 228 determines whether at least a portion of the first plurality of sound properties match at least a portion of the second plurality of sound properties. For example, control circuitry 228 may compare the acoustic envelope of query 104 to the acoustic envelope of query 108. When at least a first portion of the acoustic envelope for the first voice input (e.g., the portion of query 104 corresponding to the word "thrones") matches at least a second portion of the acoustic envelope for the second voice input (e.g., the portion of query 108 corresponding to the word "THRONES"), control circuitry 228 may determine that the user is attempting to perform a correction to the corresponding portion of response 106 (e.g., the word "Homes" in response 106).

At 412, control circuitry 228 determines whether both the time threshold is satisfied and whether there was an acoustic similarity between the first voice input (e.g., query 104) and the second voice input (e.g., query 108). When both conditions are met, the user has uttered a word in the second query (e.g., query 108) that sounds similar to a word in the first query (e.g., query 104) within a short amount of time, it is possible that the user is attempting to correct a previously generated text string (e.g., response 106). However, these two conditions alone may not be enough to determine whether the user is correcting a previous query or issuing a new command. For example, sometimes the user may use two words that sound the same in temporally proximate queries when the user is trying to change a context of the conversation. In an example, a first query "Show me Game of Thrones episodes" and the second query "Show me Game of Thrones soundtrack," the second query does not attempt to correct the first query. Control circuitry 228 determines whether there are any additional linguistic elements that indicate whether the user is attempting to correct a previously generated response, such as an intensity spike (e.g., user speaks louder), pitch change (e.g., user increases pitch of voice), or the presence of a corrective expression (e.g., "No," "Wrong," etc.).

At 414, control circuitry 228 determines whether there is an intensity spike between the first voice input and the second voice input. When two people are having a conversation and one person misunderstands the other, one may raise the volume of their voice so that the other person can better understand. Accordingly, when control circuitry 228 detects such an occurrence, control circuitry 228 may determine that the user is trying to correct an ASR error. For example, control circuitry 228 may measure an intensity of query 104 (e.g., in dB) and may measure an intensity of query 108. Control circuitry 228 may compare the two measured intensities and may determine whether the intensity of the second voice input (e.g., query 108) surpasses the intensity of the first voice input (e.g., query 104) by a threshold amount. Control circuitry 228 may retrieve the threshold from a database, such as database 212. The threshold may vary based on the intensity level or may be a static value. For example, the threshold may be 1 dB or may be 1 dB when the intensity is less than 50 dB, but may be 2 dB when the intensity is greater than 50 dB. As depicted in FIG. 1, query 108 is depicted having a shouting volume (all capital letters) whereas query 104 is depicted having a normal volume (sentence case). If the intensity of the second voice input (e.g., query 108) surpasses that of the first voice input (e.g., query 104) by the threshold amount, and both the time threshold is satisfied and there is acoustic similarity between the two voice inputs, control circuitry 228 determines that the user is inputting a correction.

At 416, control circuitry 228 determines whether there is a pitch change between the first voice input (e.g., query 104) and the second voice input (e.g., query 108). Because in natural conversations a person may indicate that a misunderstanding occurred by changing the pitch of their voice, control circuitry 228 determines whether there is a pitch change between the first voice input and the second voice input to determine whether the second voice input is a correction. For example, control circuitry 228 may detect the sound properties for both the first voice input and the second voice input as discussed above. Control circuitry 228 may compare the pitch of the first voice input with the pitch of the second voice input and may determine that there was a pitch change when a difference between the pitch values is greater than a threshold amount. In some instances, the threshold value may be stored on and retrieved from a database, such as database 212. The threshold value may be a static value or may be based on the measured pitch (e.g., a percentage of the measured pitch). When the difference between the pitch values exceeds the threshold value, control circuitry 228 determines that there is a pitch change. By detecting the pitch change, control circuitry 228 can more accurately determine whether the user intends to correct an ASR error or the user is issuing a new command.

At 418, control circuitry 228 determines whether the second voice input (e.g., query 108) contains a corrective expression. When two people are speaking, one may indicate to the other that there is a misunderstanding by stating a corrective expression such as "No," "Wrong," "Not," etc. In one example, control circuitry 228 determines whether the second voice input comprises a corrective expression by converting the second voice input to text and determining whether any words in the text match entries in a database of corrective expressions (e.g., database 212). In another example, control circuitry 228 may compare sound phones detected in a speech signal to a database of corrective expression phones (e.g., database 212) and determine whether the phones detected in the speech signal match phones in the database. As an example, control circuitry 228 would not detect the presence of a corrective word in query 108 ("THRONES") but would detect the presence of a corrective expression when the second voice input is "No, Thrones."

At 420, control circuitry 228 determines whether any of the conditions at 414, 416, and 418 are true. Because a positive identification of an intensity spike, pitch change, or corrective expression alone is not enough to indicate that the user intends to correct an ASR error, at 422, control circuitry 228 determines whether the results at 420 and 412 are both true. At 424, control circuitry 228 determines that the user intends to correct an ASR error when the time threshold is satisfied (e.g., the second voice inputs was received in close temporal proximity to response 106 or was received in close temporal proximity to query 104), there is acoustic similarity between the voice inputs (e.g., a sound in the first voice input partially matches a sound in the second voice input), and at least one of the following is true: 1) an intensity spike occurred between the first and second voice input; 2) a pitch change occurred between the first and second voice input; or 3) the second voice input contained a corrective expression. If the results at 420 and 412 are not both true, then control circuitry 228 determines that the user is not making a correction and may accordingly process the second voice input as a new query.

Figure 6:
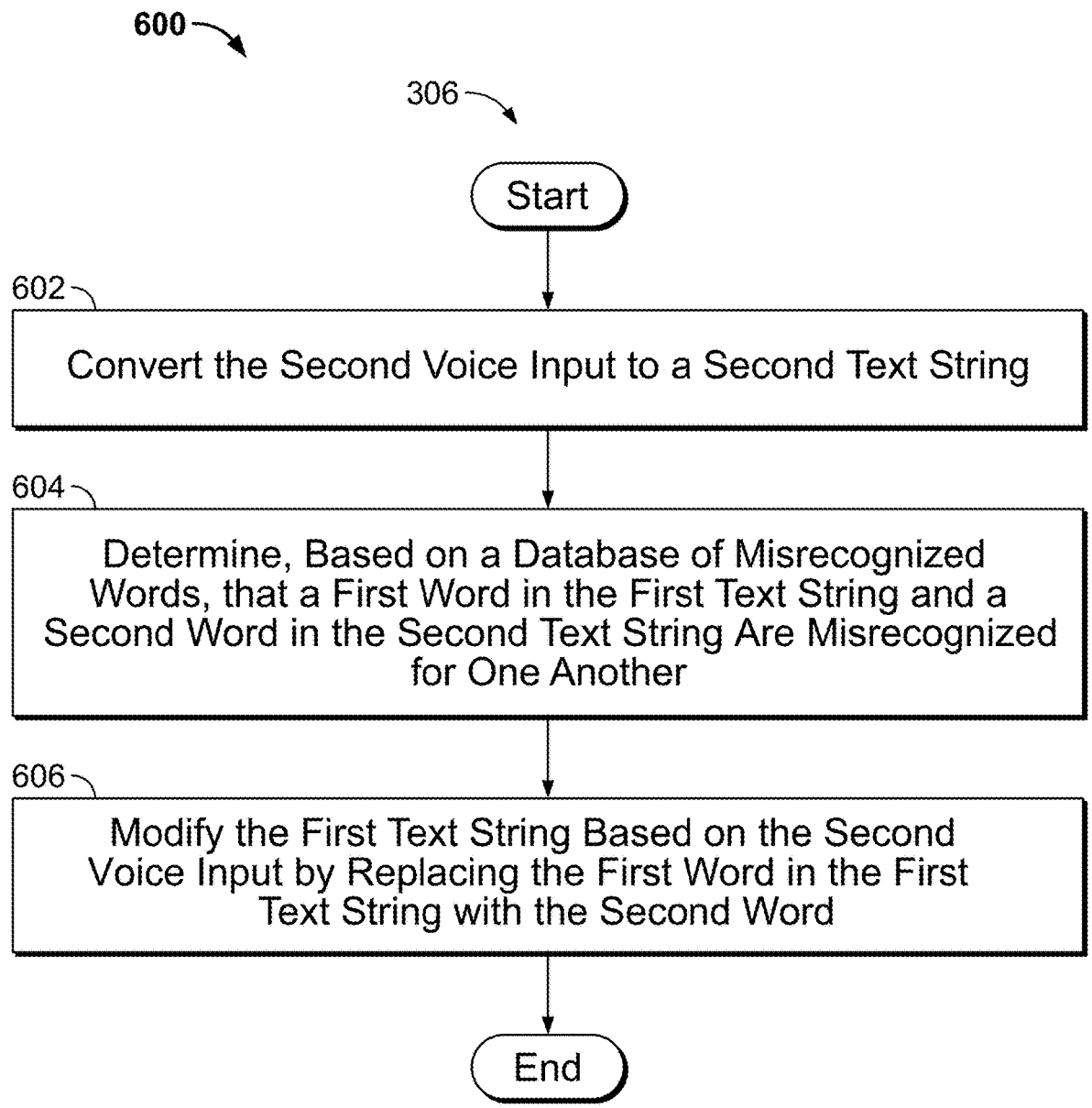
FIG. 6 depicts an illustrative flowchart for correcting an ASR error based on words in a voice input, in accordance with some embodiments of the disclosure.

FIG. 6 depicts an additional example process 306 for correcting an ASR error based on words in a voice input, in accordance with some embodiments of the present disclosure. At 602, control circuitry 228 converts the second voice input to a second text string. For example, control circuitry 228 may perform an ASR process on query 108 to identify a word in the query—"Thrones." At 604, control circuitry 228 determines, based on a database of misrecognized words, that a first word in the first test string and a second word in the second text string are misrecognized for one another. For example, control circuitry 228 may look up an entry for "thrones" in database 212 and may retrieve words that are commonly misrecognized as thrones. Entries in the database may be determined based on how closely phones for the word match another. For example, the database entry for "thrones" may list the words "homes" and "throws." When the first text string (e.g., response 106) contains a first word matching the database entry, control circuitry 228 determines that the user intends to correct the first word ("homes") for the second word in the second voice input ("thrones").

At 606, control circuitry 228 modifies the first text string based on the second voice input by replacing the first word in the first text string with the second word. For example, control circuitry 228 modifies the text string by replacing the word "homes" with the word "thrones" and generates the modified text string "Show me Game of Thrones" (response 110).

Because in conventional conversational speech a user may vary the pitch of a word to indicate that a misunderstanding occurred, control circuitry 228 may additionally determine whether there is a variation in the pitch between the first portion of the first query and the second portion of the second query. When there is no variation in the pitch, control circuitry 228 may determine that the user is issuing a new command having a word that was also in the previous query. When there is a variation in the pitch, control circuitry 228 may determine that the user is varying the pitch to correct an error in a previous response.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for correcting a speech recognition error, the method comprising:
    detecting a first voice input;
    generating a text string based on the first voice input;
    detecting a second voice input, wherein the second voice input was input within a predetermined time threshold of the generating the text string based on the first voice input;
    determining whether the second voice input is directed to correcting the text string generated based on the first voice input, by:
        identifying a first plurality of sound properties corresponding to the first voice input;
        identifying a second plurality of sound properties corresponding to the second voice input;
        comparing each of the first plurality of sound properties of the first voice input to each corresponding one of the second plurality of sound properties of the second voice input; and
        determining, based on the comparing, whether the second voice input is directed to correcting the text string previously generated based on the first voice input when a number of the first plurality of sound properties that matches the second plurality of sound properties is greater than a predetermined threshold and at least one of the first plurality of sound properties does not match the corresponding one of the second plurality of sound properties; and
    in response to the determining that the second voice input is directed to correcting the text string, modifying the text string based on the second voice input.

2. The method of claim 1, wherein determining whether the second voice input is directed to correcting the text string comprises:
    determining that at least one of an acoustic envelope, an intensity, a pitch, a frequency, or an amplitude of the second voice input exceeds a threshold.

3. The method of claim 1, wherein determining that at least the portion of the first plurality of sound properties matches the at least the portion of the second plurality of sound properties comprises determining that an acoustic envelope of the at least the portion of the second plurality of sound properties matches an acoustic envelope of the at least the portion of the first plurality of sound properties.

4. The method of claim 1, wherein the text string previously generated based on the first voice input is a first text string, and wherein determining whether the second voice input is directed to correcting the first text string comprises:
    converting the second voice input to a second text string; and
    determining, based on a database of misrecognized words, that a first word in the first text string and a second word in the second text string are misrecognized for one another.

5. The method of claim 4, wherein modifying the first text string based on the second voice input comprises replacing the first word in the first text string with the second word.

6. The method of claim 1, further comprising:
    identifying, based at least in part on the sound property of the second voice input, a portion of the text string to be modified,
    wherein the modifying the text string comprises modifying only the identified portion of the text string.

7. The method of claim 1, wherein the sound property of the voice input comprises at least one of an acoustic envelope, an intensity, a pitch, a frequency, or an amplitude.

8. The method of claim 1, wherein the sound property corresponds to a correction expression.

9. A system for correcting a speech recognition error, the system comprising:
    memory; and
    control circuitry configured to:
        detect a first voice input;
        generate a text string based on the first voice input;

detect a second voice input, wherein the second voice input was input within a predetermined time threshold of the generating the text string based on the first voice input;
determine whether the second voice input is directed to correcting the text string previously generated based on the first voice input, by:
- identifying a first plurality of sound properties corresponding to the first voice input;
- identifying a second plurality of sound properties corresponding to the second voice input;
- compare each of the first plurality of sound properties of the first voice input to each corresponding one of the second plurality of sound properties of the second voice input; and
- determining, based on the comparing, whether the second voice input is directed to correcting the text string previously generated based on the first voice input when a number of the first plurality of sound properties that matches the second plurality of sound properties is greater than a predetermined threshold and at least one of the first plurality of sound properties does not match the corresponding one of the second plurality of sound properties; and in response to the determining that the second voice input is directed to correcting the text string, modify the text string based on the second voice input.

10. The system of claim 9, wherein the control circuitry is configured to determine whether the second voice input is directed to correcting the text string by:
determining that at least one of an acoustic envelope, an intensity, a pitch, a frequency, or an amplitude of the second voice input exceeds a threshold.

11. The system of claim 9, wherein the control circuitry is configured to determine that at least the portion of the first plurality of sound properties matches the at least the portion of the second plurality of sound properties by determining that an acoustic envelope of the at least the portion of the second plurality of sound properties matches an acoustic envelope of the at least the portion of the first plurality of sound properties.

12. The system of claim 9, wherein the text string previously generated based on the first voice input is a first text string, and wherein the control circuitry is configured to determine whether the second voice input is directed to correcting the first text string by:
converting the second voice input to a second text string; and
determining, based on a database of misrecognized words, that a first word in the first text string and a second word in the second text string are misrecognized for one another.

13. The system of claim 12, wherein the control circuitry is configured to modify the first text string based on the second voice input by replacing the first word in the first text string with the second word.

14. The system of claim 9, wherein the control circuitry is further configured to:
identify, based at least in part on the sound property of the second voice input, a portion of the text string to be modified,
wherein the modifying the text string comprises modifying only the identified portion of the text string.

15. The system of claim 9, wherein the sound property of the voice input comprises at least one of an acoustic envelope, an intensity, a pitch, a frequency, or an amplitude.

16. The system of claim 9, wherein the sound property corresponds to a correction expression.

17. A method for correcting a speech recognition error, the method comprising:
detecting a first voice input;
generating a text string based on the first voice input;
detecting a second voice input, wherein the second voice input was input within a predetermined time threshold of the generating the text string based on the first voice input;
identifying a first plurality of sound properties corresponding to the first voice input;
identifying a second plurality of sound properties corresponding to the second voice input;
comparing each of the first plurality of sound properties of the first voice input to each corresponding one of the second plurality of sound properties of the second voice input;
determining, based on the comparing, whether a number of the first plurality of sound properties that matches the second plurality of sound properties is greater than a predetermined threshold and at least one of the first plurality of sound properties does not match the corresponding one of the second plurality of sound properties; and
in response to the determining that the number of the first plurality of sound properties matches the second plurality of sound properties is greater than the predetermined threshold and at least one of the first plurality of sound properties does not match the corresponding one of the second plurality of sound properties, modifying the text string based on the second voice input.

* * * * *